United States Patent
Taniguchi et al.

(10) Patent No.: US 8,760,531 B2
(45) Date of Patent: Jun. 24, 2014

(54) IMAGE PROCESSING DEVICE, IMAGE PROCESSING METHOD, AND IMAGING APPARATUS

(75) Inventors: Daisuke Taniguchi, Kanagawa (JP); Manabu Kawashima, Tokyo (JP)

(73) Assignee: Sony Corporation, Tokyo (JP)

( * ) Notice: Subject to any disclaimer, the term of this patent is extended or adjusted under 35 U.S.C. 154(b) by 434 days.

(21) Appl. No.: 13/271,314

(22) Filed: Oct. 12, 2011

(65) Prior Publication Data
US 2012/0105671 A1    May 3, 2012

(30) Foreign Application Priority Data
Oct. 29, 2010  (JP) ................ P2010-243627

(51) Int. Cl.
*H04N 5/228*  (2006.01)
*H04N 5/217*  (2011.01)
(52) U.S. Cl.
USPC ..................... 348/222.1; 348/241
(58) Field of Classification Search
None
See application file for complete search history.

(56) References Cited

U.S. PATENT DOCUMENTS

| | | | | |
|---|---|---|---|---|
| 8,400,533 B1 * | 3/2013 | Szedo et al. | ................... | 348/241 |
| 2003/0156205 A1 * | 8/2003 | Sasaki et al. | ............... | 348/222.1 |
| 2007/0002154 A1 * | 1/2007 | Kang et al. | .................... | 348/272 |
| 2007/0110300 A1 * | 5/2007 | Chang et al. | .................. | 382/162 |
| 2008/0298722 A1 * | 12/2008 | Lee et al. | ...................... | 382/300 |
| 2009/0034878 A1 * | 2/2009 | Sakamoto | ..................... | 382/300 |

FOREIGN PATENT DOCUMENTS

JP     3510037     1/2004

OTHER PUBLICATIONS

U.S. Appl. No. 08/407,423, John F. Hamilton, Jr.

* cited by examiner

*Primary Examiner* — Sinh Tran
*Assistant Examiner* — Jason Flohre
(74) *Attorney, Agent, or Firm* — Frommer Lawrence & Haug LLP; William S. Frommer

(57) ABSTRACT

An image processing device includes: a first interpolation unit that performs interpolation using pixel information of pixels having a color same as a color of a pixel of attention and present around the pixel of attention; a second interpolation unit that interpolates color information lost in the pixel of attention using color information of the pixels around the pixel of attention; a combining unit that combines outputs of the first and second interpolation units; a first filter that includes a first filter frequency characteristic and detects a first image of a first region; a second filter that includes a second filter frequency characteristic and detects a second image of a second region; and a combination-ratio generating unit that generates a value for determining a combination ratio of the outputs of the first and second interpolation units in the combining unit.

5 Claims, 6 Drawing Sheets

| B00 | G01 | B02 |
|-----|-----|-----|
| G10 | R11 | G12 |
| B20 | G21 | B22 |

IMAGE PROCESSING DEVICE, IMAGE PROCESSING METHOD, AND IMAGING APPARATUS

FIELD

The present disclosure relates to an image processing device, an image processing method, and an imaging apparatus for applying color interpolation to an image obtained by a 1-CCD color imaging apparatus.

BACKGROUND

Solid state imaging devices such as a CCD (Charge Coupled Device Image Sensor) and a CMOS (Complementary Metal Oxide Semiconductor) usually have a structure in which light receiving elements are arranged in a lattice shape to make it possible to sequentially read out amounts of charges generated by photoelectric conversion of the light receiving elements. Usually, since these light receiving elements have a single spectral characteristic, an image signal obtained from the solid state imaging device is one channel concerning a color (single color). Therefore, when it is desired to obtain a color image (e.g., a three-channel image of RGB or the like) with one solid state imaging device, a solid state imaging device attached with filters having different spectral characteristics (colors) for the respective light receiving elements is used. An imaging apparatus including such one color solid state imaging device is generally referred to as 1-CCD color imaging apparatus.

Since an image signal for each of the light receiving elements obtained from the 1-CCD color imaging apparatus is information concerning one color, color interpolation processing is performed in order to supplement the information with information concerning the other two colors. However, when linear interpolation performed using color information of peripheral pixels is applied to an image signal obtained from a color solid state imaging device including a Bayer array, which is an array of a color filter in most general use, false colors, which are not colors of a subject, could occur in an image in portions of high-frequency components such as fine patterns and edges.

As a color interpolation method for realizing suppression of false colors, there is an ACPI (Adaptive color plane interpolation) method (see, for example, Japanese Patent No. 3510037). In the ACPI method, for example, when the position of an image of G (green), which is one of three primary colors, is supplemented with information concerning R (red), suppression of false colors is realized by changing information concerning R according to a change in information concerning G.

SUMMARY

However, although the ACPI method has a certain degree of a false color suppression effect, since interpolation is performed on the assumption that a scanning direction of edges is vertical or horizontal, it is difficult to accurately calculate interpolation values of colors concerning edges in oblique directions belonging to neither the vertical nor the horizontal edge direction. Therefore, false colors still could occur.

In various kinds of color interpolation processing such as the linear interpolation and the ACPI method, saw-teeth-like noise, the amplitude of which periodically changes, called zipper noise could occur because of excessive correction performed when the color interpolation processing is applied to an edge portion in a place of an image where the frequency is not so high.

Therefore, it is desirable to provide an image processing device, an image processing method, and an imaging apparatus that can suppress occurrence of false colors due to color interpolation and suppress occurrence of zipper noise involved in the false color suppression.

An embodiment of the present disclosure is directed to an image processing device including: a first interpolation unit that performs, from image information obtained by a 1-CCD color imaging device including a Bayer array, interpolation using pixel information of pixels having a color same as a color of a pixel of attention and present around the pixel of attention; a second interpolation unit that interpolates, from the image information, color information lost in the pixel of attention using color information of the pixels around the pixel of attention; a combining unit that combines an output of the first interpolation unit and an output of the second interpolation unit; a first filter that includes a first filter frequency characteristic having a pass peak point in a high-frequency band and detects, from the image information, a first image of a first region where a false color tends to occur in the interpolation by the second interpolation unit; a second filter that includes a second filter frequency characteristic having a non-pass point in the high-frequency band and having a pass band further on a low frequency side than the high-frequency band and detects, from the image information, a second image of a second region where zipper noise tends to occur because of excessive interpolation by the second interpolation unit; and a combination-ratio generating unit that generates, on the basis of the first image and the second image, a value for determining a combination ratio of the output of the first interpolation unit and the output of the second interpolation unit in the combining unit.

In the embodiment of the present disclosure, the image processing device obtains, as a final interpolation result, a result obtained by combining the output of the first interpolation unit and the output of the second interpolation unit at a ratio determined on the basis of the first region where a false color tends to occur and the second region where zipper noise tends to occur because of excessive interpolation. Consequently, it is possible to suppress false colors and occurrence of zipper noise involved in the false color suppression.

The combination-ratio generating unit may generate the value for determining the combination ratio on the basis of a value obtained by subtracting the second image from the first image.

The combination-ratio generating unit may generate the value for determining the combination ratio using nonlinear processing on the basis of a value obtained by subtracting the second image from the first image. Consequently, a false color suppression effect is further increased and it is possible to reduce influences due to a zipper occurrence region that is not completely removed.

Another embodiment of the present disclosure is directed to an image processing method including: performing, in a first interpolation unit, from image information obtained by a 1-CCD color imaging device including a Bayer array, interpolation using pixel information of pixels having a color same as a color of a pixel of attention and present around the pixel of attention; interpolating, in a second interpolation unit, from the image information, color information lost in the pixel of attention using color information of the pixels around the pixel of attention; combining an output of the first interpolation unit and an output of the second interpolation unit; detecting, using a first filter that includes a first filter frequency characteristic having a pass peak point in a high-frequency band, from the image information, a first image of a first region where a false color tends to occur in the interpolation by the second interpolation unit; detecting, using a second filter that includes a second filter frequency characteristic having a non-pass point in the high-frequency band and having a pass band further on a low frequency side than the high-frequency band, from the image information, a second image of a second region where zipper noise tends to occur because of excessive interpolation by the second interpolation unit; and generating, on the basis of the first image and the second image, a value for determining a combination ratio of the output of the first interpolation unit and the output of the second interpolation unit.

Still another embodiment of the present disclosure is directed to an imaging apparatus including: a 1-CCD color imaging device including a Bayer array; a first interpolation unit that performs, from image information obtained by the 1-CCD color imaging device, interpolation using pixel information of pixels having a color same as a color of a pixel of attention and present around the pixel of attention; a second interpolation unit that interpolates, from the image information, color information lost in the pixel of attention using color information of the pixels around the pixel of attention; a combining unit that combines an output of the first interpolation unit and an output of the second interpolation unit; a first filter that includes a first filter frequency characteristic having a pass peak point in a high-frequency band and detects, from the image information, a first image of a first region where a false color tends to occur in the interpolation by the second interpolation unit; a second filter that includes a second filter frequency characteristic having a non-pass point in the high-frequency band and having a pass band further on a low frequency side than the high-frequency band and detects, from the image information, a second image of a second region where zipper noise tends to occur because of excessive interpolation by the second interpolation unit; and a combination-ratio generating unit that generates, on the basis of the first image and the second image, a value for determining a combination ratio of the output of the first interpolation unit and the output of the second interpolation unit in the combining unit.

According to the embodiments of the present disclosure, it is possible to suppress occurrence of false colors due to color interpolation and suppress occurrence of zipper noise involved in the false color suppression.

DETAILED DESCRIPTION

Embodiments of the present disclosure are explained below with reference to the drawings.

The embodiment relates to an image processing device that interpolates information concerning lost two colors and applies color separation to a signal of each of light receiving elements obtained from a 1-CCD color imaging apparatus in which a color filter of a Bayer type is combined with a 1-CCD imaging device.

<Embodiment>
[Configuration of an Imaging Apparatus]

Figure 1:
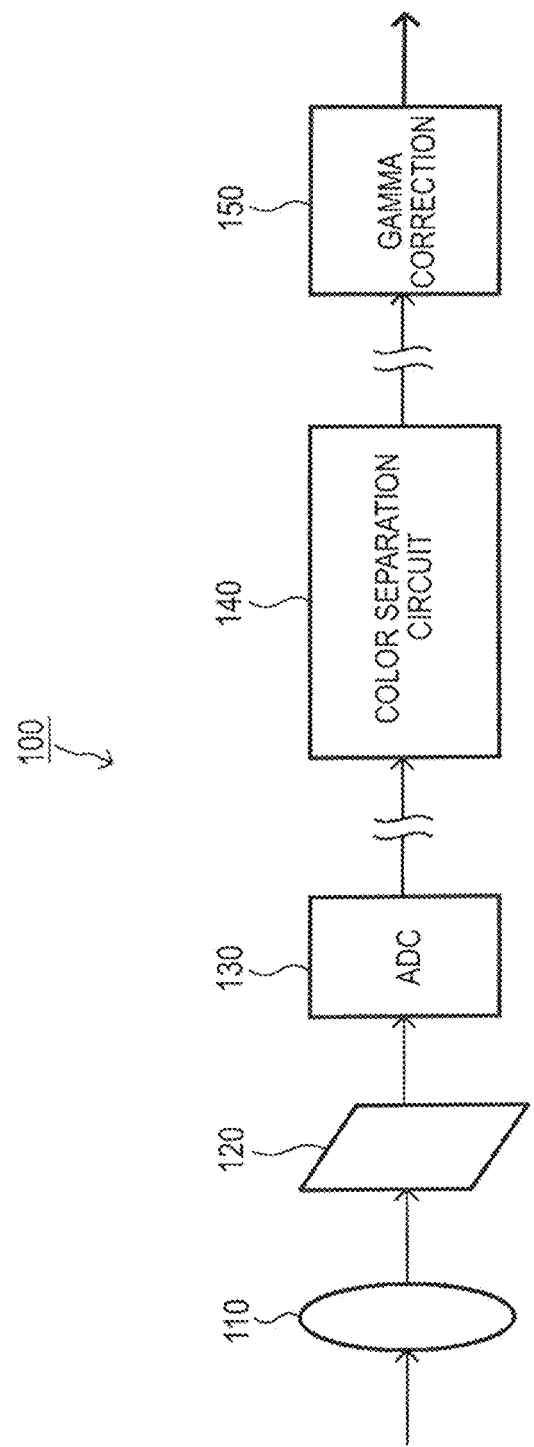
FIG. 1 is a diagram showing the configuration of an imaging apparatus according to an embodiment of the present disclosure.

FIG. 1 is a diagram showing the configuration of an imaging apparatus according to an embodiment of the present disclosure. As shown in the figure, this imaging apparatus 100 includes an imaging lens 110, a 1-CCD color imaging device 120 including a Bayer array, an ADC (Analog-to-Digital Converter) 130, a color separation circuit 140, and a gamma correction circuit 150.

The imaging lens 110 is, for example, a double convex lens that focuses light from an object on an imaging device.

The 1-CCD color imaging device 120 is a 1-CCD color imaging device in which a color filter of a Bayer type is combined with a 1-CCD imaging device. The 1-CCD color imaging device converts light captured from the imaging lens 110 through a color filter into an electric signal and converts the electric signal into electronic image data (RAW data).

The ADC 130 converts mosaic analog RAW data obtained by the 1-CCD color imaging device 120 into digital data.

The color separation circuit 140 is a circuit that generates a full-color image from the mosaic digital RAW data using color interpolation processing.

The gamma correction circuit 150 is a circuit that adjusts a correlation between an RGB signal obtained from the color separation circuit 140 and a signal obtained when the RGB signal is actually output.

In the imaging apparatus 100, the color separation circuit 140 includes a configuration that can suppress occurrence of zipper noise involved in processing for false color suppression. The color separation circuit 140 is explained in detail below.

[Color Separation Circuit 140]

Figure 2:
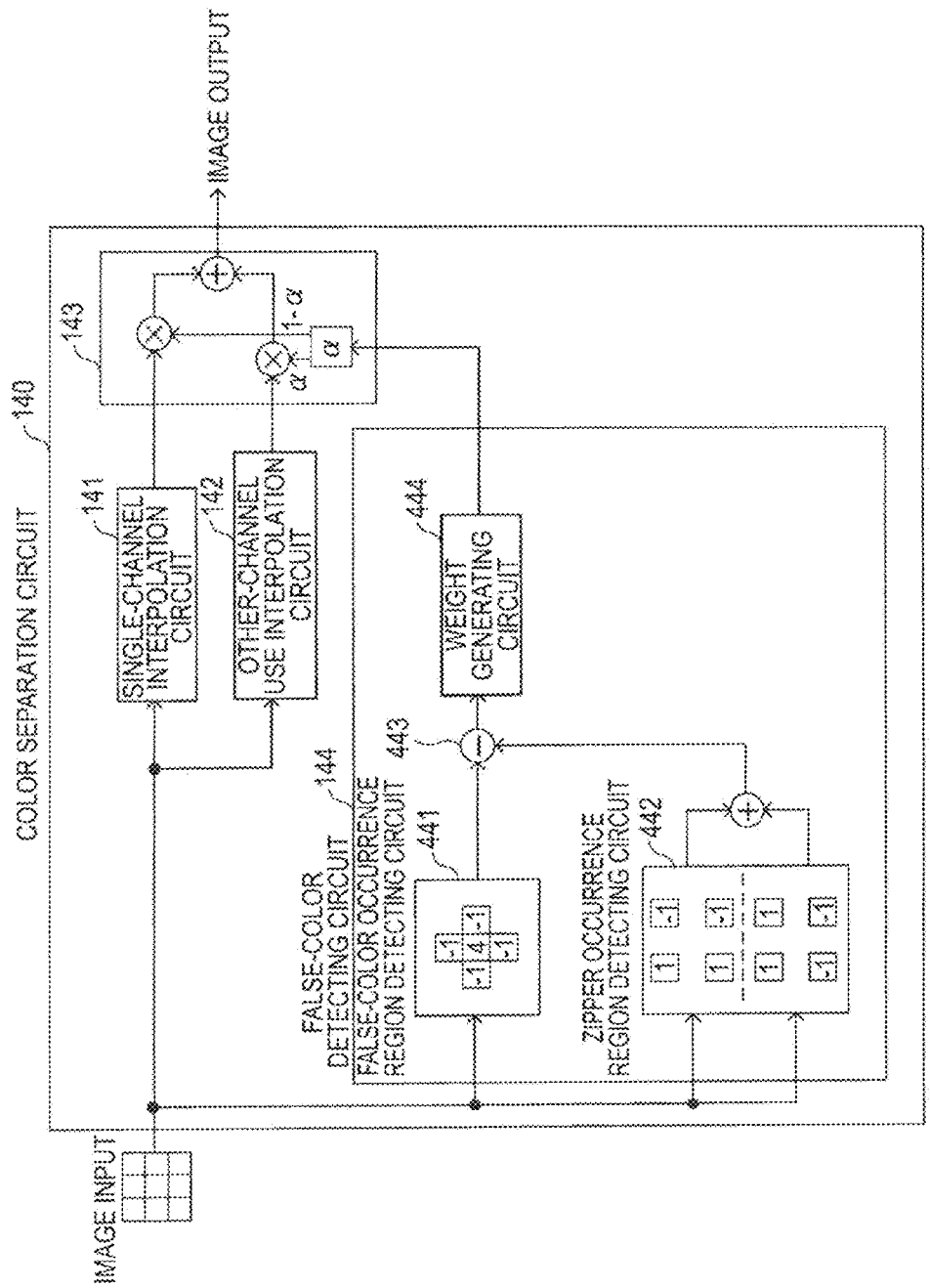
FIG. 2 is a block diagram showing the configuration of a color separation circuit shown in FIG. 1.

FIG. 2 is a diagram showing the configuration of the color separation circuit 140.

The color separation circuit 140 (an image processing device) includes a single-channel interpolation circuit 141, an other-channel use interpolation circuit 142; a weighted combination circuit 143, and a false-color detecting circuit 144.

The single-channel interpolation circuit 141 (a first interpolation unit) is a circuit that performs interpolation using pixel information of pixels having a color same as a color of a pixel of attention and present around the pixel of attention without changing color information lost in the pixel of attention. For example, the single-channel interpolation circuit 141 is a circuit that performs interpolation by, for example, using, as information concerning the pixel of attention, a value calculated by a simple average of luminance information of pixels having the same color present around the pixel of attention.

The other-channel use interpolation circuit 142 (a second interpolation unit) is a circuit that interpolates the color information lost in the pixel of attention using color information of the pixels around the pixel of attention.

The weighted combination circuit 143 (a combining unit) is a circuit that multiplies outputs of each of the same pixels of the single-channel interpolation circuit 141 and the other-channel use interpolation circuit 142 with coefficients (an α value and a 1-α value) each corresponding to a weight value supplied from the false-color detecting circuit 144 and combines the outputs.

The false-color detecting circuit 144 detects, as a "false-color occurrence region detection value", an image of a region where a false color tends to occur in interpolation processing by the other-channel use interpolation circuit 142 (hereinafter referred to as "false-color occurrence region"). The false-color detecting circuit 144 detects, as a "zipper occurrence region detection value", an image of a region where zipper noise tends to occur because of excessive interpolation by the other-channel use interpolation circuit 142 (hereinafter referred to as "zipper occurrence region"). The false-color detecting circuit 144 subtracts the zipper occurrence region detection value from the false-color occurrence region detection value to thereby detect a region obtained by excluding the zipper occurrence region from the false-color occurrence region (hereinafter referred to as "false color region") and generates a weight value supplied to the weighted combination circuit 143 from a "false-color region detection value", which is a result of the detection.

In the color separation circuit 140 having such a configuration, the RAW data digitized by the ADC 130 is input respectively to the single-channel interpolation circuit 141, the other-channel use interpolation circuit 142, and the false-color detection circuit 144. Outputs of the single-channel interpolation circuit 141 and the other-channel use interpolation circuit 142 are input to the weighted combination circuit 143. In the weighted combination circuit 143, the outputs are multiplied with the coefficients (the α value and the 1-α value) each corresponding to the weight value calculated by the false-color detecting circuit 144. A combined result is obtained as a final interpolation result.

[Concerning the False-Color Detecting Circuit 144]

The false-color detecting circuit 144 includes a false-color occurrence region detecting circuit 441 (a first filter), a zipper occurrence region detecting circuit 442 (a second filter), a subtraction circuit 443 (a combination-ratio generating unit), and a weight generating circuit 444 (the combination-ratio generating unit).

In the linear interpolation performed using color information of pixels around a pixel of attention, false colors could occur in portions of high-frequency components such as fine patterns and edges. In the ACPI method or the like, since interpolation is performed on the assumption that a scanning direction of edges is vertical or horizontal, it is difficult to accurately calculate interpolation values concerning portions including high-frequency components in oblique directions belonging to neither the vertical nor the horizontal edge direction. Therefore, false colors still could occur. The false-color occurrence region detecting circuit 441 regards a region including high-frequency components in the horizontal direction, the vertical direction, and the oblique directions as a false-color occurrence region and detects an image of the false-color occurrence region as a false-color occurrence region detection value.

A specific example of the false-color occurrence region detecting circuit 441 is explained.

Figures 3, 4:
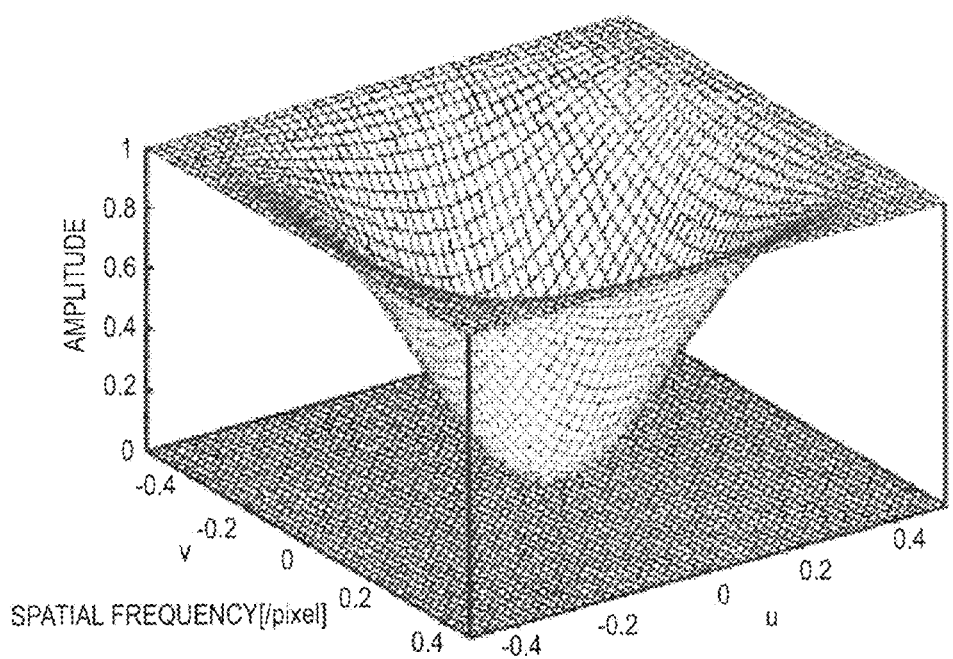
FIG. 3 is a diagram showing a Bayer array.
FIG. 4 is a diagram showing a filter frequency characteristic of a false-color occurrence region detecting circuit.

Interpolation of a G component in an R pixel position "R11" in a Bayer array shown in FIG. 3 is examined. The false-color occurrence region detecting circuit 441 detects a high-frequency component of a color difference between G and R according to, for example, the following formula and obtains a result of the detection as a false-color occurrence region detection value for each of pixels.

$$(\text{False-color occurrence region detection value})\_11 = \\ (12 \times (G11' - R11) - 2 \times (G01 - R01') - 2 \times (G10 - R10') - \\ 2 \times (G12 - R12') - 2 \times (G21 - G21') - (G00' - R00') - \\ (G02' - R02') - (G20' - R20') - (G22' - R22'))/16 \quad (1)$$

Values of pixels with apostrophes are values calculated by interpolation using color information of other channels.

FIG. 4 is a diagram showing a filter frequency characteristic of the false-color occurrence region detecting circuit 441. One abscissa (u) indicates a frequency component in the horizontal direction of the Bayer array, the other abscissa (v) indicates a frequency component in the vertical direction of the Bayer array, and the ordinate indicates a gain. The filter frequency characteristic of the false-color occurrence region detecting circuit 441 has pass peaks in high-frequency bands, in particular, high-frequency bands in the vertical direction, the horizontal direction, and 45-degree oblique directions. The gain decreases as the frequency decreases.

The filter frequency characteristic of the false-color occurrence region detecting circuit 441 makes it possible to effectively detect a false-color occurrence region. However, since the filter frequency characteristic has a pass band in a lower frequency side than a high-frequency band as well, a zipper occurrence region where zipper noise due to excessive interpolation for an image in a frequency band lower than the high-frequency band tends to occur is also detected. In this embodiment, the zipper occurrence region detecting circuit 442 that can detect a zipper occurrence region detection value is provided such that a false color region can be detected by subtracting the zipper occurrence region where zipper noise tends to occur in this way from the false-color occurrence region.

As a filter that realizes the zipper occurrence region detecting circuit 442, since zipper noise occurs because of excessive interpolation for an image on a lower frequency side than a high-frequency band, a filter having a non-pass point (a point of gain 0) and having a pass band on the lower frequency side than the high-frequency band is adopted.

An example of a calculation formula of the zipper occurrence region detecting circuit 442 having such a filter frequency characteristic is shown below.

$$(H \text{ direction zipper occurrence region detection} \\ \text{value})\_11 = (\text{abs}((G00' - R00') - (G02' - R02')) + \text{abs} \\ (G20' - R20') - (G22' - R22')))/4 \quad (2)$$

$$(V \text{ direction zipper occurrence region detection} \\ \text{value})\_11 = (\text{abs}((G00' - R00') - (G20' - R20')) + \text{abs} \\ (G02' - R02') - (G22' - R22')))/4 \quad (3)$$

$$(\text{Zipper occurrence region detection value})\_11 = ((H \\ \text{direction zipper occurrence region detection} \\ \text{value})\_11 + (V \text{ direction zipper occurrence region} \\ \text{detection value})\_11/2 \quad (4)$$

Values of pixels with apostrophes are values calculated by interpolation using color information of other channels.

Figure 5:
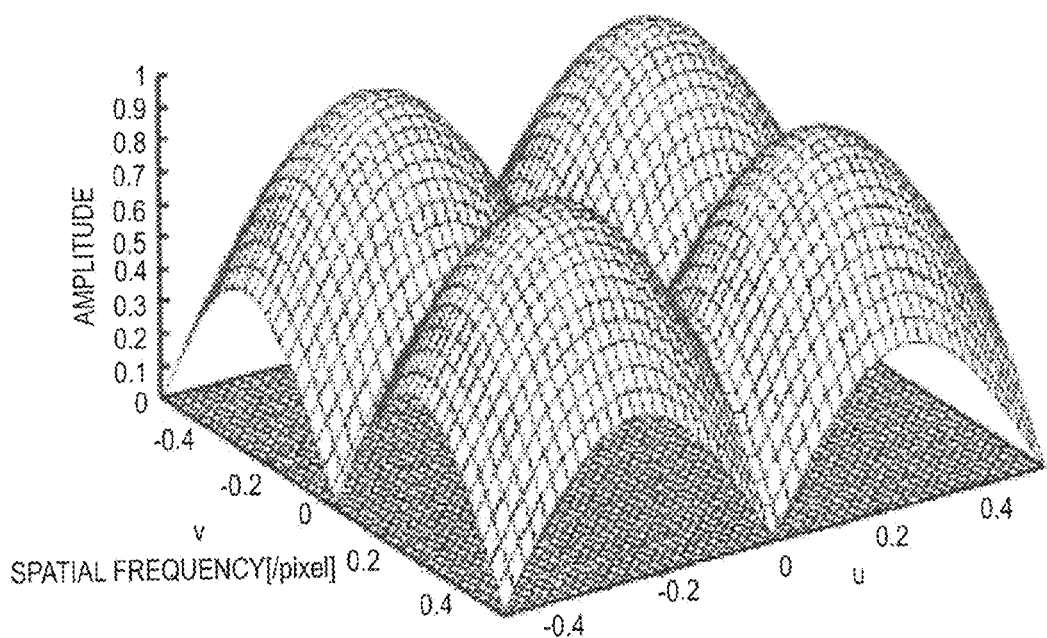
FIG. 5 is a diagram showing a filter frequency characteristic of a zipper occurrence region detecting circuit.

FIG. 5 is a diagram showing a filter frequency characteristic of the zipper occurrence region detecting circuit 442. One abscissa (u) indicates a frequency component in the horizontal direction of the Bayer array, the other abscissa (v) indicates a frequency component in the vertical direction of the Bayer array, and the ordinate indicates a gain. The filter frequency characteristic of the zipper occurrence region detecting circuit 442 has non-pass points in high-frequency bands in the vertical direction, the horizontal direction, and the 45-degree oblique directions.

The subtraction circuit 443 subtracts the zipper occurrence region detection value from the false-color occurrence region detection value to generate a false-color region detection value and outputs the false-color region detection value to the weight generating circuit 444.

(False-color region detection value)_11=(false-color occurrence region detection value)_11=(zipper occurrence region detection value)_11     (5)

Figure 6:
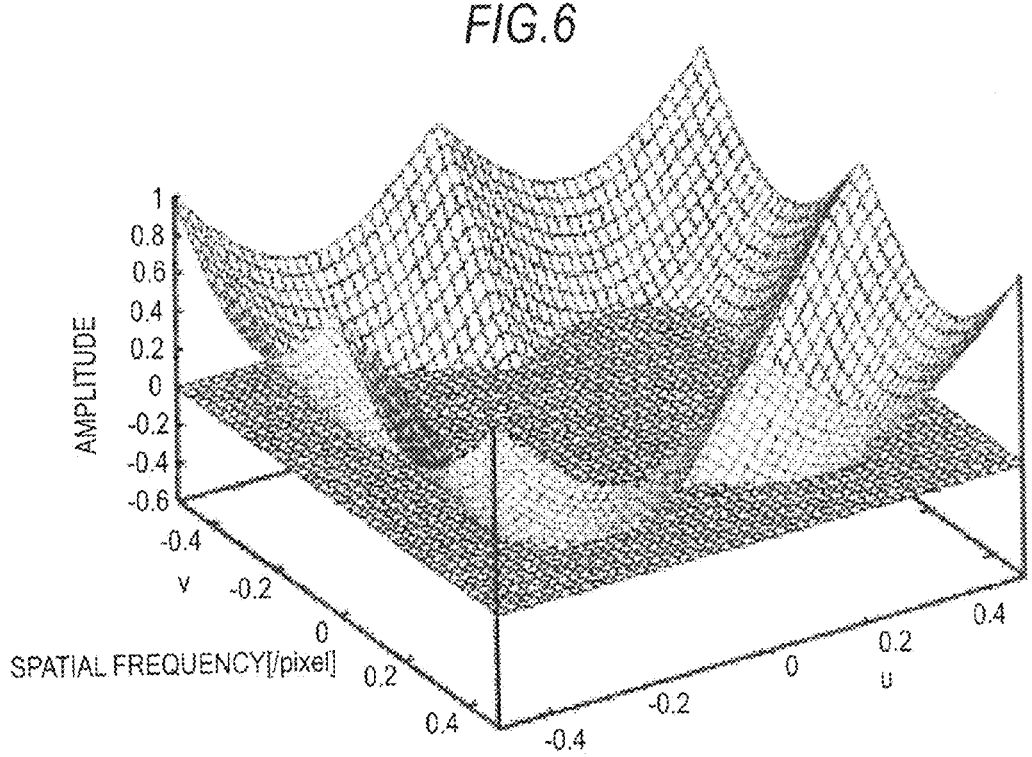
FIG. 6 is a diagram showing a filter frequency characteristic of a false-color detecting circuit.

A filter frequency characteristic of the false-color detecting circuit 144 is shown in FIG. 6. In this way, the filter frequency characteristic of the false-color detecting circuit 144 has pass bands only in high-frequency bands in all of the horizontal direction, the vertical direction, and the oblique directions. Therefore, the filter frequency characteristic satisfies a characteristic that a false color region obtained by excluding the zipper occurrence region where zipper noise involved in color interpolation tends to occur from the false-color occurrence region can be accurately detected.

The weight generating circuit 444 is a circuit that normalizes the false-color region detection value and generates a weight value supplied to the weighted combination circuit 143. The weight value is a value for determining a ratio at which the weighted combination circuit 143 combines an output of the single-channel interpolation circuit 141 and an output of the other-channel use interpolation circuit 142. The weight value takes, for example, a value from 0 to 1.

The weighted combination circuit 143 multiplies the outputs of the single-channel interpolation circuit 141 and the other-channel use interpolation circuit 142 with coefficients (an $\alpha$ value and a 1-$\alpha$ value) each corresponding to the weight value supplied from the false-color detecting circuit 144 and combines the outputs. The weighted combination circuit 143 sets the weight value to the $\alpha$ value, multiplies the output of the other-channel use interpolation circuit 142 with the $\alpha$ value, multiplies the output of the single-channel interpolation circuit 141 with the (1-$\alpha$) value, and outputs a result obtained by adding up the outputs as a final interpolation result.

When the weight value supplied from the false-color detecting circuit 144 is relatively large, i.e., the false-color region detection value is large, $\alpha > (1-\alpha)$. The weighted combination circuit 143 combines the output of the other-channel use interpolation circuit 142 with the output of the single-channel interpolation circuit 141 at a large ratio. Specifically, assuming that the output of the other-channel use interpolation circuit 142 is relatively highly likely to be an interpolation result for pixels in which zipper noise does not tend to occur according to interpolation or false color suppression, the weighted combination circuit 143 sets a combination ratio for the output of the other-channel use interpolation circuit 142 relatively high compared with the output of the single-cannel interpolation circuit 141.

Conversely, when the weight value supplied from the false-color detecting circuit 144 is small, i.e., the false-color region detection value is relatively small, $\alpha < (1-\alpha)$. The weighted combination circuit 143 combines the output of the single-channel interpolation circuit 141 with the output of the other-channel use interpolation circuit 142 at a large ratio. Specifically, assuming that the output of the other-channel use interpolation circuit 142 is relatively highly likely to be an interpolation result for pixels in which zipper noise tends to occur according to interpolation or false color suppression, the weighted combination circuit 143 sets a combination ratio for the output of the single-channel interpolation circuit 141 relatively high compared with the output of the other-channel use interpolation circuit 142.

In the imaging apparatus including the color separation circuit 140 configured as explained above, the false-color detecting circuit 144 detects a false color region obtained by excluding the zipper occurrence region from the false-color occurrence region. The weighted combination circuit 143 obtains, as a final interpolation result, a result obtained by combining the output of the single-channel interpolation circuit 141 and the output of the other-channel use interpolation circuit 142 at a ratio corresponding to a weight value corresponding to a detection value of the false color region. Consequently, it is possible to suppress false colors and suppress occurrence of zipper noise involved in the false color suppression.

<Modification 1>

In the method of calculating a zipper occurrence region detection value explained above, an arithmetic mean of an H-direction zipper occurrence region detection value and a V-direction zipper occurrence region detection value is set as the zipper occurrence region detection value. However, a larger one of the H-direction zipper occurrence region detection value and the V-direction zipper occurrence region detection value may be set as the zipper occurrence region detection value.

<Modification 2>

In Formula (5) of the subtraction circuit 443, a detection value of (false-color region detection value)_11 may be adjusted by multiplying each of (false-color occurrence region detection value)_11 and (zipper occurrence region detection value)_11 with a gain.

<Modification 3>

Adjustment by a user indicated by the following formula may be applied to the calculation of weight by the weight generating circuit 444.

(Weight)=(false-color region detection value)_11×
(false-color suppression level adjustment value)/
(data type maximum value)     (6)

The false-color suppression level adjustment value can be set by the user in a range from 0 to the data type maximum value.

<Modification 4>

Figure 7:
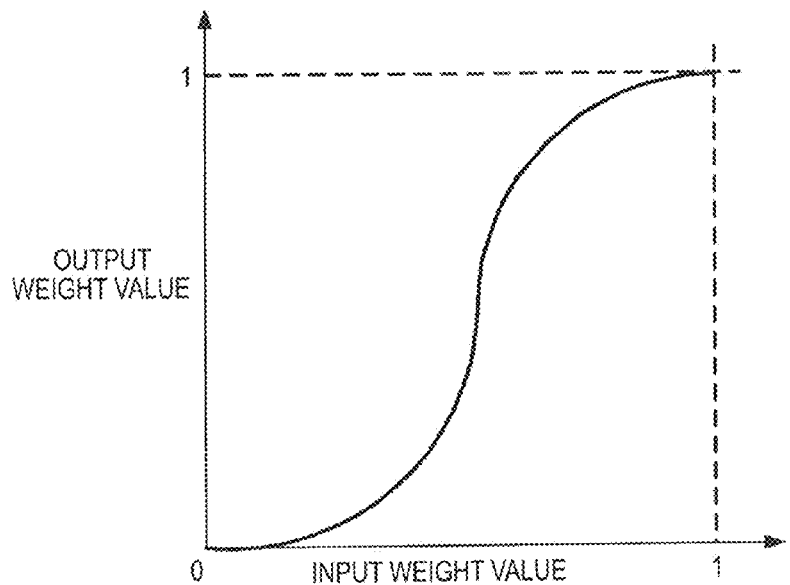
FIG. 7 is a diagram showing non-linear processing of a weighted combination circuit.

For example, a result obtained by applying non-linear processing shown in FIG. 7 to the weight value calculated by the weight generation in the embodiment or the modification 1 may be supplied to the weighted combination circuit 143. The non-linear processing is applied to the weight value such that the false-color suppression effect of the false color region is further increased and the influences due to the zipper occurrence region not completely removed can be reduced. Alternatively, the non-linear processing may be performed when the weight generating circuit 444 normalizes the false-color region detection value and generates weight.

<Modification 5>

The weight generating circuit 444 may determine whether the false-color region detection value is equal to or larger than a predetermined threshold. When the false-color region detection value is equal to or larger than the predetermined threshold, the weight generating circuit 444 sets the weight value to "1". When the false-color region detection value is smaller than the threshold, the weight generating circuit 444 sets the weight value to "0". In this case, the weighted combination circuit 143 only has to simply select and output one of the outputs for each same pixel of the single-channel interpolation circuit 141 and the other-channel use interpolation circuit 142. Therefore, there is an advantage that the configuration of the weighted combination circuit 143 is simplified.

<Modification 6>

In the embodiment, the false-color occurrence generation region detecting circuit 441 and the zipper occurrence region detecting circuit 442 calculate, using the interpolation processing, the values of the pixels with apostrophes of Formulas (1), (2), and (3) and then calculate the false-color occurrence region detection value and the zipper occurrence region detection value. However, the present disclosure is not limited to this. The other-channel use interpolation circuit 142 may calculate pixel information of all channels and supply the pixel information to each of the false-color occurrence region detecting circuit 441 and the zipper occurrence region detecting circuit 442. Consequently, it is possible to expect an increase in speed compared with the embodiment.

<Modification 7>

A modification of the filter frequency characteristic of the false-color occurrence region detecting circuit 441 is explained below.

In this modification, the false-color occurrence region detecting circuit 441 detects a high-frequency component of a color difference between G and R according to the following formula and obtains a result of the detection as a false-color occurrence region detection value for each of pixels.

$$\text{(False-color occurrence region detection value)}\_11 = (4 \times (G11' - R11) - (G01 - R01') - (G10 - R10') - (G12 - R12') - (G21 - R21'))/8 \quad (7)$$

Values of pixels with apostrophes are values calculated by interpolation using color information of other channels.

Figure 8:
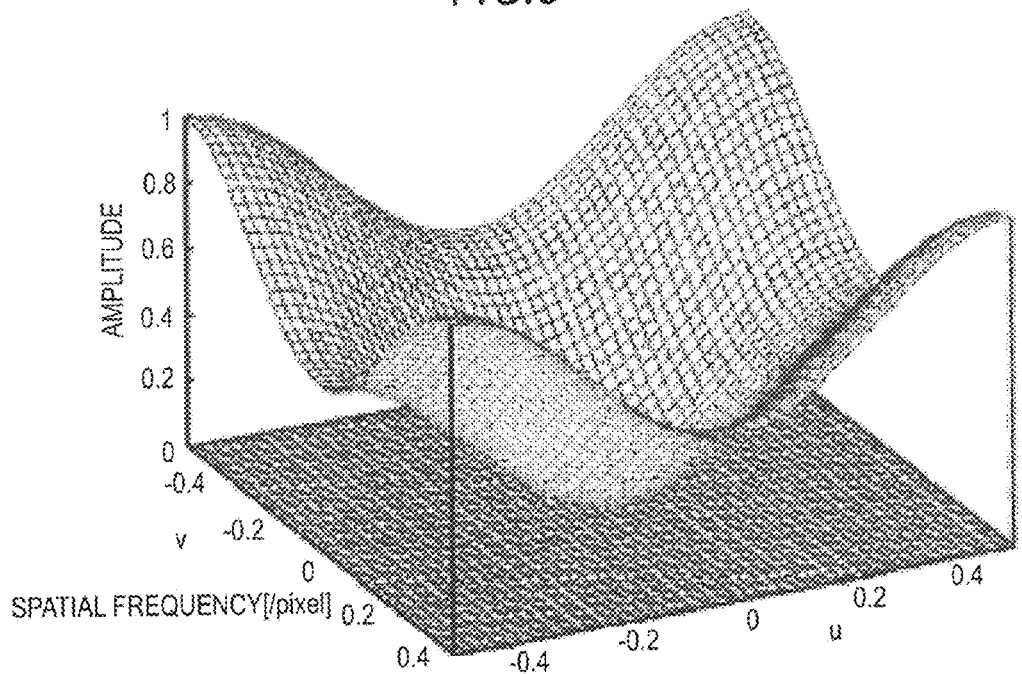
FIG. 8 is a diagram showing another filter frequency characteristic of the false-color occurrence region detecting circuit.

FIG. 8 is a diagram showing a filter frequency characteristic of the false-color occurrence region detecting circuit 441. One abscissa (u) indicates a frequency component in the horizontal direction of the Bayer array, the other abscissa (v) indicates a frequency component in the vertical direction of the Bayer array, and the ordinate indicates a gain. The filter frequency characteristic of the false-color occurrence region detecting circuit 441 has pass peaks in high-frequency bands, in particular, high-frequency bands in the 45-degree oblique directions. The gain decreases as the frequency decreases.

The false-color occurrence region detecting circuit 441 has an advantage that a circuit size can be reduced compared with the false-color occurrence region detecting circuit 441 explained in the embodiment. Since a pass band is closer to the high-frequency side compared with the filter frequency characteristic of the false-color occurrence region detecting circuit 441 explained in the embodiment, the false-color occurrence region detecting circuit 441 in this modification has a characteristic that the false-color occurrence region detecting circuit 441 does not relatively detect a zipper occurrence region where zipper noise tends to occur. On the other hand, since gains in the horizontal direction and the vertical direction are half compared with a gain in the oblique directions, a detection value of a false color is calculated rather small. However, when it is considered that G components are arranged in a checkered pattern in the Bayer array and, since there is no information in the oblique directions, a false-color tends to occur in edges in the oblique direction, the filter frequency characteristic in this modification is sufficient. It can be said that the false-color occurrence region detecting circuit 441 is extremely practical from a viewpoint that the circuit size can be reduced.

Figure 9:
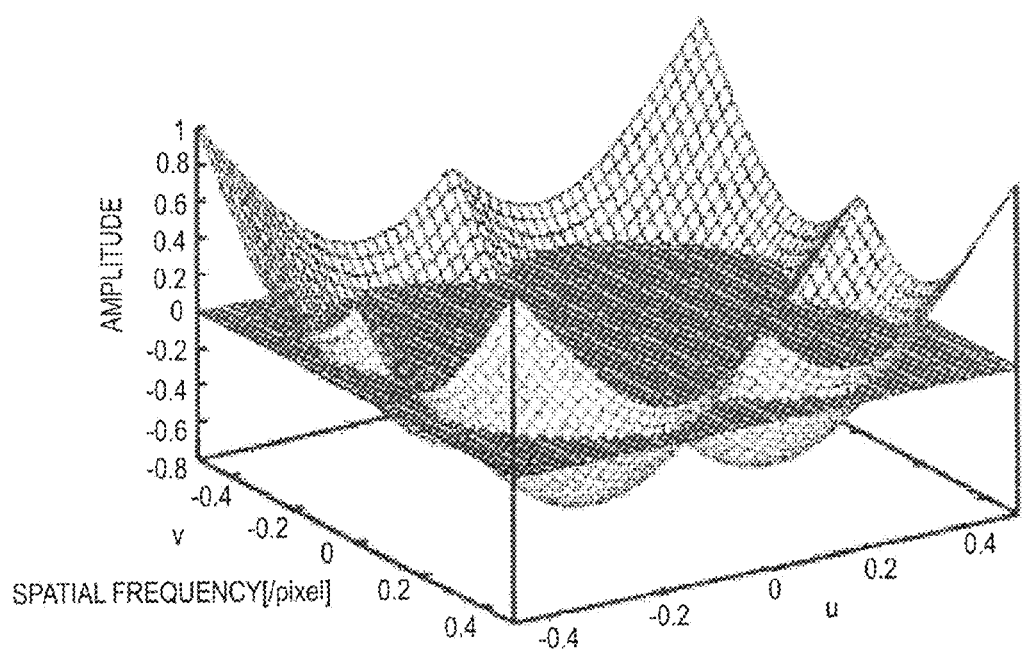
FIG. 9 is a diagram showing another filter frequency characteristic of the false-color detecting circuit.

A filter frequency characteristic of the false-color detecting circuit 144 in which the false-color occurrence region detecting circuit 441 in this modification and the zipper occurrence region detecting circuit 442 in the embodiment are combined is shown in FIG. 9.

Besides, the present disclosure is not limited to only the embodiment. It goes without saying that various updates can be applied to the embodiment without departing from the spirit of the present disclosure.

The present disclosure contains subject matter related to that disclosed in Japanese Priority Patent Application JP 2010-243627 filed in the Japan Patent Office on Oct. 29, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
    a first interpolation unit that performs, from image information obtained by a 1-CCD color imaging device including a Bayer array, interpolation using pixel information of pixels having a color same as a color of a pixel of attention and present around the pixel of attention;
    a second interpolation unit that interpolates, from the image information, color information lost in the pixel of attention using color information of the pixels around the pixel of attention;
    a combining unit that combines an output of the first interpolation unit and an output of the second interpolation unit;
    a first filter that includes a first filter frequency characteristic having a pass peak point in a high-frequency band and detects, from the image information, a first image of a first region where a false color tends to occur in the interpolation by the second interpolation unit;
    a second filter that includes a second filter frequency characteristic having a non-pass point in the high-frequency band and having a pass band further on a low frequency side than the high-frequency band and detects, from the image information, a second image of a second region where zipper noise tends to occur because of excessive interpolation by the second interpolation unit; and
    a combination-ratio generating unit that generates, on the basis of the first image and the second image, a value for determining a combination ratio of the output of the first interpolation unit and the output of the second interpolation unit in the combining unit.

2. The image processing device according to claim 1, wherein the combination-ratio generating unit generates the value for determining the combination ratio on the basis of a value obtained by subtracting the second image from the first image.

3. The image processing device according to claim 2, wherein the combination-ratio generating unit generates the value for determining the combination ratio using nonlinear processing on the basis of a value obtained by subtracting the second image from the first image.

4. An image processing method comprising:
    performing, in a first interpolation unit, from image information obtained by a 1-CCD color imaging device including a Bayer array, interpolation using pixel information of pixels having a color same as a color of a pixel of attention and present around the pixel of attention;
    interpolating, in a second interpolation unit, from the image information, color information lost in the pixel of attention using color information of the pixels around the pixel of attention;
    combining an output of the first interpolation unit and an output of the second interpolation unit;

detecting, using a first filter that includes a first filter frequency characteristic having a pass peak point in a high-frequency band, from the image information, a first image of a first region where a false color tends to occur in the interpolation by the second interpolation unit;

detecting, using a second filter that includes a second filter frequency characteristic having a non-pass point in the high-frequency band and having a pass band further on a low frequency side than the high-frequency band, from the image information, a second image of a second region where zipper noise tends to occur because of excessive interpolation by the second interpolation unit; and generating, on the basis of the first image and the second image, a value for determining a combination ratio of the output of the first interpolation unit and the output of the second interpolation unit.

5. An imaging apparatus comprising:

a 1-CCD color imaging device including a Bayer array;

a first interpolation unit that performs, from image information obtained by the 1-CCD color imaging device, interpolation using pixel information of pixels having a color same as a color of a pixel of attention and present around the pixel of attention;

a second interpolation-unit that interpolates, from the image information, color information lost in the pixel of attention using color information of the pixels around the pixel of attention;

a combining unit that combines an output of the first interpolation unit and an output of the second interpolation unit;

a first filter that includes a first filter frequency characteristic having a pass peak point in a high-frequency band and detects, from the image information, a first image of a first region where a false color tends to occur in the interpolation by the second interpolation unit;

a second filter that includes a second filter frequency characteristic having a non-pass point in the high-frequency band and having a pass band further on a low frequency side than the high-frequency band and detects, from the image information, a second image of a second region where zipper noise tends to occur because of excessive interpolation by the second interpolation unit; and a combination-ratio generating unit that generates, on the basis of the first image and the second image, a value for determining a combination ratio of the output of the first interpolation unit and the output of the second interpolation unit in the combining unit.

* * * * *